United States Patent [19]

Narumi et al.

[11] Patent Number: 4,987,107

[45] Date of Patent: Jan. 22, 1991

[54] CERAMIC COMPOSITION FOR REDUCTION-REOXIDATION TYPE SEMICONDUCTIVE CAPACITOR

[75] Inventors: Kazuhito Narumi, Bibai; Fumio Takeuchi; Michiaki Sakaguchi, both of Iwamizawa, all of Japan

[73] Assignee: Nippon Oil & Fats Co., Ltd., Tokyo, Japan

[21] Appl. No.: 360,607

[22] Filed: Jun. 2, 1989

[30] Foreign Application Priority Data

Jun. 3, 1988 [JP] Japan ................................. 63-135695

[51] Int. Cl.$^5$ ............................................. C04B 35/46
[52] U.S. Cl. ..................................... 501/137; 501/138; 501/139; 501/136
[58] Field of Search ................. 501/37, 139, 138, 134; 123/549; 252/520

[56] References Cited

U.S. PATENT DOCUMENTS

| | | | |
|---|---|---|---|
| 3,586,642 | 6/1971 | Matsuo et al. | 501/139 |
| 3,912,527 | 11/1975 | Utsumi et al. | 501/138 |
| 4,015,230 | 3/1977 | Nitta et al. | 252/520 |
| 4,055,438 | 10/1977 | Wada et al. | 501/138 |
| 4,222,783 | 9/1980 | Atsumi et al. | 501/138 |
| 4,283,753 | 8/1981 | Burn | 501/138 |
| 4,335,216 | 6/1982 | Hodgkins et al. | 501/138 |
| 4,753,906 | 6/1988 | Nishigaki et al. | 501/138 |
| 4,767,732 | 8/1988 | Furukawa et al. | 501/138 |
| 4,834,052 | 5/1989 | Hori et al. | 123/549 |

FOREIGN PATENT DOCUMENTS

| | | |
|---|---|---|
| 0222303 | 5/1987 | European Pat. Off. . |
| 747716 | 4/1956 | United Kingdom . |
| 964726 | 7/1964 | United Kingdom . |

*Primary Examiner*—William R. Dixon, Jr.
*Assistant Examiner*—Susan Hollenbeck
*Attorney, Agent, or Firm*—Oblon, Spivak, McClelland, Maier & Neustadt

[57] ABSTRACT

A ceramic composition for a reduction-reoxidation type semiconductive capacitor, comprising (A) barium titanate or barium titanate and strontium titanate, (B) titanium oxide, and (C) at least one oxide selected from the group consisting of the oxides severally of La, Ce, Nb, Nd, Dy, Y, Sb, W, and Ta in a molar ratio of $100:0.01 \sim 15:0.01 \sim 10$ and further comprising (D) 0.001 to 1% by weight, based on the total amount of the compounds, (A), (B), and (C), of at least one oxide selected from the group consisting of the oxides severally of Cu, Zn, Al, Mg, and Mo and exhibiting a breakdown voltage of not less than 900 V, and insulation resistance of not less than $10^{10}\Omega$, an electrostatic capacity per unit surface area of not less than 0.06 $\mu F/cm^2$, and a low dielectric loss, tan $\delta$, of not more than 2.0%.

6 Claims, No Drawings

CERAMIC COMPOSITION FOR REDUCTION-REOXIDATION TYPE SEMICONDUCTIVE CAPACITOR

BACKGROUND OF THE INVENTION

1. Field of the Invention

This invention relates to a ceramic composition for a reoxidation semiconductive ceramic capacitor.

In recent years, the trend in electronic devices has been toward smaller components with high component density and stable quality. Demand has thus increased for electronic components that are compact and of improved quality. Thus, the desirability of developing a reduction-reoxidation type semiconductive ceramic capacitor excelling in insulation resistance and breakdown voltage, enjoying a small size and a large capacity, and yielding only to small dielectric loss has found growing recognition.

2. Prior Art Statement

Heretofore, as materials usable for the reduction-reoxidation type semiconductive ceramic capacitors, the $BaTiO_3$-$La_2O_3$-$TiO_2$ type solid solution composition and the composition having not more than 0.6% by weight of manganese carbonate incorporated in the solid solution mentioned above have been known to the art. The ceramic capacitors formed of these compositions acquire a capacity per unit area of 0.27 $\mu F/cm^2$, a dielectric loss expressed tan $\delta$ of 2.8%, and a breakdown voltage of 800 V as characteristic properties (Japanese Patent Publication No. SHO 51(1976)-44738).

The composition having not more than 1 atomic % of the oxides of Cr, Mn, Fe, Co, and Ni and not more than 2 atomic % of the oxide of Si incorporated in the $BaTiO_3$-$SrTiO_3$-$Ln_2O_3$-$TiO_2$ (Ln for a lanthanum series element) type solid solution composition has been also known. The ceramic capacitor formed of this composition acquires a capacity per unit surface area of 0.58 $\mu F/cm^2$, a dielectric loss, tan $\delta$, of 2.8%, and a breakdown voltage of 820 V as characteristic properties (Japanese Patent Public Disclosure No. SHO 58(1983)-14518).

However, there has been desired a capacitor which excels these conventional reduction-reoxidation type semiconductive ceramic capacitors in performance and particularly retains a breakdown voltage of not less than 900 V, possesses a still larger capacity per unit area, and suffers from a still lower dielectric loss. Various studies are now under way for the development of such a capacitor. Generally, a thin dielectric layer in the surface region bears largely on the capacity, insulation resistance, breakdown voltage, and dielectric loss of the reduction-reoxidation type semiconductive ceramic capacity. Though the capacitor's capacity per unit surface area is increased by decreasing the thickness of the dielectric layer, the decrease of the thickness of the dielectric layer inevitably lowers the insulation resistance and the breakdown voltage. Conversely, an attempt to heighten the insulation resistance and the breakdown voltage necessitates an increase in the thickness of the electric layer and entails a decrease in the capacity per unit surface area. While the capacitor's dielectric loss hinges on the tan $\delta$ of the dielectric layer, it bears in a larger measure on the series resistance component of the boundary between the dielectric layer and the semiconductive ceramic. This series resistance component must be decreased to lower tan $\delta$. Particularly since the tan $\delta$ is an important property for the capacitor, an increase the value of tan $\delta$ forms a serious drawback. Any decrease in this value, even if slight, is significant. What is required in a new ceramic composition which permits production of a capacitor possessing a high resistivity index and a high breakdown voltage per unit thickness of the dielectric layer and exhibiting a low series resistance component. To be specific, the capacitor formed of this ceramic composition is required to exhibit a breakdown voltage of not less than 900 V, an insulation resistance of not less than $10^{10}$ $\Omega$, and a capacity per unit surface area of 0.60 $\mu F/cm^2$ as its characteristic properties.

OBJECT AND SUMMARY OF THE INVENTION

The inventors have continued a study with a view to developing a ceramic composition fulfilling the object described above. This invention has been perfected as the result.

To be specific, this invention is directed to a ceramic composition for a reduction-reoxidation type semiconductive capacitor, comprising barium titanate, titanium oxide, and at least one oxide selected from the group consisting of the oxides severally of La, Ce, Nb, Nd, Dy, Y, Sb, W, and Ta in a molar ratio of 100:0.01~15:0.01~10 and further comprising 0.001 to 1% by weight, based on the total amount of said compounds, of at least one oxide selected from the group consisting of the oxides severally of Cu, Zn, Al, Mg, and Mo and also to a composition having strontium titanate as a substitute for at most ¼ of the mol of the barium titanate component of the ceramic composition mentioned above, namely containing strontium titanate in a molar ratio of not more than ⅓ relative to the barium titanate component.

DETAILED DESCRIPTION OF THE PREFERRED EMBODIMENTS

Barium titanate or barium titanate and strontium titanate constitute main components of the ceramic composition of this invention. Strontium titanate has an ability to lower the curie point of barium titanate (about 120° C.) and can take the place of part of barium titanate. If the amount of strontium titanate used for this substitution is large, the curie point is lowered too much and the relative dielectric constant is lowered excessively and, as the result, the capacity per unit surface area becomes unduly small. Thus, the molar ratio of strontium titanate to barium titanate is defined to be not more than ⅓.

While the mixture of the raw materials is fired, titanium oxide reacts with strontium oxide and barium oxide and forms strontium titanate and barium titanate. Consequently, any excess of titanium oxide which survives the reaction persists in the sintered mass produced. If the amount of the unaltered titanium oxide is unduly small, the mixture of raw material being fired exhibits a poor sintering property and the ceramic composition obtained by the firing has a small capacity for a capacitor and suffers from an increase of tan $\delta$. In the present invention, therefore, the titanium oxide content of the composition is defined to be in the range of 0.01 to 15 mols, based on 100 mols of barium titanate (or the total amount of barium titanate and strontium titanate).

The oxides of La, Ce, Nb, Nd, Dy, Y, Sb, W, and Ta combine the same ability to lower the curie point as strontium oxide and an ability to decrease the resistance of a semiconductor. If the content of at least one of these oxides in the ceramic composition of this invention is less than 0.01 mol or more than 10 mols, based on 100 mols of barium titanate (or the total amount of barium titanate and strontium titanate), the mixture of raw materials fails to acquire a sufficient semiconductive property when the firing thereof is carried out in a reducing atmosphere. Thus, the reduction-reoxidation type semiconductive ceramic capacity aimed at is not obtained. Preferably, the content of the oxide is in the range of 0.5 to 5 mols.

If the amount of at least one of the oxides of Cu, Zn, Al, Mg, and Mo is less than 0.001% by weight or more than 1% by weight, based on the total amount of barium titanate or barium titanate and strontium titanate, titanium oxide, and at least one of the oxides of La, Ce, Nb, Nd, Dy, Y, Sb, W, and Ta, the increase in the capacity per unit surface area and the decrease in tan δ are not sufficient. Particularly from the standpoint of availability of raw material, the oxides of Cu, Zn, and Al are particularly desirable among other oxides mentioned above. From the standpoint of capacitor performance, the content of the oxide is desired to be in the range of 0.005 to 0.8% by weight.

The composition of this invention for the reduction-reoxidation type semiconductive ceramic capacitor can be easily produced by any of the conventional procedures. One example of these procedures is shown below.

The compounds as raw materials, e.g. barium carbonate, strontium carbonate, titanium oxide, at least one of the oxides of La, Ce, Nb, Nd, Dy, Y, Sb, W, and Ta, and at least one of the oxides of Cu, Zn, Al, Mg, and Mo are fired independently of one another. Then, the fired compounds are mixed in amounts conforming to the percentage composition mentioned above and the resultant mixture is sintered at a temperature in the range of 1,200° to 1,400° C. for a period in the range of 1 to 4 hours. Now, the method for producing a reduction-reoxidation type semiconductive ceramic capacitor from the composition of this invention prepared as described above will be shown below. In the current of a reducing gas such as, for example, $H_2$, CO, or $NH_3$ supplied alone or as mixed with such an inert gas as nitrogen gas or argon, the composition of this invention is treated at a temperature in the range of 900° to 1,250° C. for a period in the range of 0.5 to 10 hours to prepare a semiconductive ceramic. In the air, this ceramic is treated at a temperature in the range of 700° to 1,200° C. for a period in the range of 0.25 to 5 hours to form a thin reoxidized layer or dielectric layer in the surface region of the ceramic. The ceramic is then coated with silver paste intended to form an electrode and fired. The reduction-reoxidation type semiconductive ceramic capacitor aimed at is obtained as the result.

As clearly noted from the working examples cited hereinafter, the reduction-reoxidation type semiconductive ceramic capacitors produced from the ceramic composition of this invention simultaneously exhibit highly satisfactory properties including high breakdown voltages exceeding 900 V, high insulation resistances exceeding $10^{10}$ Ω and large capacities per unit surface area exceeding 0.60 μF/cm$^2$ and nevertheless low dielectric losses, tan δ, of not more than 2.0%. Thus, the present invention realizes the production of a reduction-reoxidation type semiconductive ceramic capacitor enjoying a high dielectric constant and a low dielectric loss without any sacrifice of the other properties.

EXAMPLES 1 TO 19

Commercially available industry grade raw materials, i.e. barium carbonate powder (not less than 99.9% in purity), strontium carbonate powder (not less than 99.9% in purity), and $TiO_2$ powder (not less than 99.9% in purity), commercially available guaranteed reagents, i.e. $La_2O_3$, $CeO_2$, $Nb_2O_5$, $Nd_2O_3$, $Dy_2O_3$, $Y_2O_3$, $Sb_2O_3$, $WO_3$, and $Ta_2O_5$ powder (invariably not less than 99.9% in purity), and commercially available guaranteed reagents, i.e. CuO, $ZnO_2$, $Al_2O_3$, MgO, and $MoO_3$ powders were mixed in ratios calculated to produce sintered compositions possessing percentage compositions indicated in Table 1. The resultant mixture were each wet blended by the use of a pot and nylon balls. The mixtures were dried and then calcined at a temperature of 1,150° C. for four hours to obtain compositions of the present invention. Each of the compositions was wet pulverized, dried, and mixed with an aqueous polyvinyl alcohol solution as a binder, and pelletized into particles of 32-mesh pass. The uniform particles were molded under a pressure of about 1 ton/cm$^2$ to produce a disc 9.5 mm in diameter and 0.5 mm in thickness. This molded disc was fired in the air at a temperature of 1,350° C. for 2 hours to give rise to a disc about 8.0 mm in diameter and about 0.4 mm in thickness. Then, this disc was vested with a semiconductive property by a heat treatment performed in the current of a mixed gas consisting of 90% of $N_2$ and 10% of $H_2$ at a temperature of 1,050° C. for 2 hours. The resultant semiconductive disc was heat-treated in the air at a temperature of 1,000° C., to produce a reduction-reoxidation type semiconductive ceramic disc. Finally a capacitor element was produced by forming silver electrodes one each on the opposite surfaces of the disc by baking. The capacitor element was tested for capacity, C, per unit surface area, dielectric loss, tan δ (using a voltage of 0.1 Vrms and a frequency of 1 kHz for the preceding test items), insulation resistance, IR (using a voltage of 25 V), and insulation breakdown voltage, Vb, by the conventional method. The results were as shown in Table 2.

TABLE 1

| Example | A component (molar ratio) | | | | | | | | | | | |
|---|---|---|---|---|---|---|---|---|---|---|---|---|
| | BaTiO$_3$ | SrTiO$_3$ | TiO$_2$ | La$_2$O$_3$ | CeO$_2$ | Nb$_2$O$_5$ | Nd$_2$O$_3$ | Dy$_2$O$_3$ | Y$_2$O$_3$ | Sb$_2$O$_3$ | WO$_3$ | Ta$_2$O$_5$ |
| 1 | 100 | | 5 | 4 | | | | | | | | |
| 2 | 90 | 10 | 3 | 1 | | | | | | | | |
| 3 | 100 | | 5 | | 4 | | | | | | | |
| 4 | 90 | 10 | 3 | | 1 | | | | | | | |
| 5 | 100 | | 5 | | | 4 | | | | | | |
| 6 | 90 | 10 | 3 | | | 1 | | | | | | |
| 7 | 100 | | 5 | | | | 4 | | | | | |
| 8 | 85 | 15 | 3 | | | | 1 | | | | | |
| 9 | 100 | | 5 | | | | | 4 | | | | |
| 10 | 90 | 10 | 3 | | | | | 1 | | | | |
| 11 | 100 | | 5 | | | | | | 4 | | | |

TABLE 1-continued

| | | | | | | | | | | | | | |
|---|---|---|---|---|---|---|---|---|---|---|---|---|---|
| 12 | 80 | 20 | 3 | | | | | 1 | | | | | |
| 13 | 100 | | 5 | | | | | | 4 | | | | |
| 14 | 90 | 10 | 3 | | | | | 1 | | | | | |
| 15 | 100 | | 5 | | | | | | | 4 | | | |
| 16 | 85 | 15 | 3 | | | | | 1 | | | | | |
| 17 | 100 | | 5 | | | | | | | | 4 | | |
| 18 | 90 | 10 | 3 | | | | | 1 | | | | | |
| 19 | 95 | 5 | 7 | 2 | 2 | | | | | | | | |

| Example | B component | | | | |
|---|---|---|---|---|---|
| | CuO | ZnO$_2$ | Al$_2$O$_3$ | MgO | MoO$_3$ |
| 1 | 0.1 | | | | |
| 2 | | 0.1 | | | |
| 3 | | | 0.2 | | |
| 4 | | | | 0.3 | |
| 5 | | | | | 0.4 |
| 6 | | | | | 0.4 |
| 7 | | | | 0.5 | |
| 8 | | | 0.6 | | |
| 9 | | 0.7 | | | |
| 10 | 0.8 | | | | |
| 11 | 0.5 | | | | |
| 12 | | 0.4 | | | |
| 13 | | | 0.3 | | |
| 14 | | | | 0.2 | |
| 15 | | | | | 0.1 |
| 16 | 0.1 | 0.1 | | | |
| 17 | 0.1 | | 0.1 | | |
| 18 | 0.1 | | | 0.1 | |
| 19 | | 0.1 | | | 0.1 |

TABLE 2

| Example Number | Capacitor properties | | | |
|---|---|---|---|---|
| | C ($\mu$F/cm$^2$) | tan $\delta$ (%) | IR ($\Omega$) | V$_B$ (V) |
| 1 | 0.72 | 1.8 | 2.2 × 10$^{10}$ | 960 |
| 2 | 0.63 | 1.7 | 2.0 × 10$^{10}$ | 980 |
| 3 | 0.64 | 1.8 | 3.4 × 10$^{10}$ | 1020 |
| 4 | 0.67 | 1.9 | 5.2 × 10$^{10}$ | 1160 |
| 5 | 0.65 | 1.7 | 4.2 × 10$^{10}$ | 1010 |
| 6 | 0.72 | 1.6 | 1.9 × 10$^{10}$ | 1130 |
| 7 | 0.71 | 1.8 | 3.7 × 10$^{10}$ | 1200 |
| 8 | 0.62 | 1.9 | 5.4 × 10$^{10}$ | 1270 |
| 9 | 0.61 | 1.4 | 4.1 × 10$^{10}$ | 1210 |
| 10 | 0.65 | 1.8 | 4.5 × 10$^{10}$ | 1150 |
| 11 | 0.64 | 1.9 | 5.7 × 10$^{10}$ | 1160 |
| 12 | 0.61 | 1.8 | 2.9 × 10$^{10}$ | 1100 |
| 13 | 0.66 | 1.5 | 2.3 × 10$^{10}$ | 990 |
| 14 | 0.70 | 1.7 | 2.0 × 10$^{10}$ | 930 |
| 15 | 0.62 | 1.8 | 3.8 × 10$^{10}$ | 1110 |
| 16 | 0.64 | 1.7 | 4.0 × 10$^{10}$ | 1100 |
| 17 | 0.63 | 1.9 | 3.6 × 10$^{10}$ | 1050 |
| 18 | 0.65 | 1.8 | 2.1 × 10$^{10}$ | 990 |
| 19 | 0.63 | 1.8 | 3.9 × 10$^{10}$ | 1010 |

COMPARATIVE EXPERIMENTS 1 TO 19

Similar capacity quality compositions were produced by following the procedures of the working examples mentioned above, excepting the use of CuO, ZnO$_2$, Al$_2$O$_3$, MgO, and MoO$_3$ was omitted. Capacitor elements were produced from the compositions and tested for the same properties as in the working examples. The results were as shown in Table 3.

TABLE 3

| Comparative Experiment | Comparative percentage composition (molar ratio) | | | | | | | | | | | | |
|---|---|---|---|---|---|---|---|---|---|---|---|---|---|
| | BaTiO$_3$ | SrTiO$_3$ | TiO$_2$ | La$_2$O$_3$ | CeO$_2$ | Nb$_2$O$_5$ | Nd$_2$O$_3$ | Dy$_2$O$_3$ | Y$_2$O$_3$ | Sb$_2$O$_3$ | WO$_3$ | Ta$_2$O$_5$ |
| 1 | 100 | | 5 | 4 | | | | | | | | |
| 2 | 90 | 10 | 3 | 1 | | | | | | | | |
| 3 | 100 | | 5 | | 4 | | | | | | | |
| 4 | 90 | 10 | 3 | | 1 | | | | | | | |
| 5 | 100 | | 5 | | | 4 | | | | | | |
| 6 | 90 | 10 | 3 | | | 1 | | | | | | |
| 7 | 100 | | 5 | | | | 4 | | | | | |
| 8 | 85 | 15 | 3 | | | | 1 | | | | | |
| 9 | 100 | | 5 | | | | | 4 | | | | |
| 10 | 90 | 10 | 3 | | | | | 1 | | | | |
| 11 | 100 | | 5 | | | | | | 4 | | | |
| 12 | 80 | 20 | 3 | | | | | | 1 | | | |
| 13 | 100 | | 5 | | | | | | | 4 | | |
| 14 | 90 | 10 | 3 | | | | | | | 1 | | |
| 15 | 100 | | 5 | | | | | | | | 4 | |
| 16 | 85 | 15 | 3 | | | | | | | | 1 | |
| 17 | 100 | | 5 | | | | | | | | | 4 |
| 18 | 90 | 10 | 3 | | | | | | | | | 1 |
| 19 | 95 | 5 | 7 | 2 | 2 | | | | | | | |

| Comparative Experiment | Capacitor properties | | | |
|---|---|---|---|---|
| | C ($\mu$F/cm$^2$) | Tan $\delta$ | IR ($\Omega$) | V$_B$ (V) |
| 1 | 0.53 | 3.6 | 7.2 × 10$^9$ | 880 |

TABLE 3-continued

| | | | | |
|---|---|---|---|---|
| 2 | 0.48 | 3.2 | $6.3 \times 10^9$ | 1010 |
| 3 | 0.44 | 2.8 | $7.7 \times 10^9$ | 970 |
| 4 | 0.37 | 2.6 | $1.9 \times 10^{10}$ | 1220 |
| 5 | 0.42 | 2.3 | $2.5 \times 10^{10}$ | 1250 |
| 6 | 0.49 | 2.9 | $3.1 \times 10^{10}$ | 1190 |
| 7 | 0.37 | 2.9 | $3.3 \times 10^{10}$ | 1120 |
| 8 | 0.42 | 3.0 | $2.9 \times 10^{10}$ | 1110 |
| 9 | 0.45 | 3.1 | $1.3 \times 10^{10}$ | 1040 |
| 10 | 0.44 | 2.9 | $1.4 \times 10^{10}$ | 1070 |
| 11 | 0.43 | 3.0 | $1.0 \times 10^{10}$ | 1040 |
| 12 | 0.47 | 2.8 | $9.2 \times 10^{10}$ | 1030 |
| 13 | 0.46 | 3.1 | $9.5 \times 10^{10}$ | 990 |
| 14 | 0.45 | 3.0 | $1.2 \times 10^{10}$ | 1000 |
| 15 | 0.43 | 2.7 | $9.8 \times 10^{10}$ | 1120 |
| 16 | 0.41 | 2.6 | $9.7 \times 10^{10}$ | 1130 |
| 17 | 0.48 | 2.7 | $5.9 \times 10^9$ | 1060 |
| 18 | 0.45 | 2.9 | $8.7 \times 10^9$ | 1080 |
| 19 | 0.44 | 3.0 | $8.2 \times 10^9$ | 1030 |

It is clearly noted from the working examples and the comparative experiments that the reduction-reoxidation type semiconductive ceramic capacitors produced from the compositions of this invention possess better properties than the conventional countertypes. Thus, the compositions of this invention are highly useful for the capacitors.

What is claimed is:

1. A ceramic composition for producing a reduction-reoxidation type semiconductive capacitor exhibiting a breakdown voltage exceeding 900 V, and insulation resistance exceeding $10^{10}\Omega$, a capacity per unit surface area exceeding 0.60 $\mu F/cm^2$ and tan $\delta$ of not more than 2.0%, consisting essentially of:
   (a) barium titanate and titanium oxide;
   (b) at least one oxide selected from the group consisting of oxides of La, Ce, Nb, Nd, Dy, Y, Sb, W and Ta, wherein the molar ratio of said barium titanate, and titanium oxide and said at least one oxide is 100:0.01 to 15:0.01 to 10; and
   (c) 0.001 to 1% by weight based on the total amount of the elements (a) and (b), of at least one oxide selected from the group consisting of oxides of Cu, Zn, Mg and Mo.

2. The ceramic composition according to claim 1, wherein the content of said at least one oxide selected from the group consisting of the oxides of La, Ce, Nb, Nd, Dy, Y, Sb, W, and Ta is in the range of 0.5 to 5 mol, per 100 mols of barium titanate.

3. The ceramic composition according to claim 1, wherein the content of said at least one oxide selected from the group consisting of the oxides of Cu, Zn, Al, Mg, and Mo is in the range of 0.005 to 0.8% by weight, based on the total amount of said compounds.

4. A ceramic composition for producing a reduction-reoxidation type semiconductive capacitor exhibiting type semiconductive capacitor exhibiting a breakdown voltage exceeding 900 V, an insulation resistance exceeding $10^{10}\Omega$, a capacity per unit surface not exceeding 0.60 $\mu F/cm^2$ and tan $\delta$ of not more than 2.0%, consisting essentially of:
   (a) barium titanate and up to one-third in molar ratio, based on the amount of barium titanate, of strontium titanate, and titanium oxide;
   (b) at least one oxide selected from the group consisting of oxides of La, Ce, Nb, Nd, Dy, Y, Sb, W and Ta, wherein the molar ratio of said barium titanate, and titanium oxide and said at least one oxide is 100:0.01 to 15:0.01 to 10; and
   (c) 0.001 to 1% by weight based on the total amount of the elements (a) and (b), of at least one oxide selected from the group consisting of oxides of Cu, Zn, Mg and Mo.

5. The ceramic composition according to claim 4, wherein the content of said at least one oxide selected from the group consisting of the oxides severally of La, Ce, Nb, Nd, Dy, Y, Sb, W, and Ta is in the range of 0.5 to 5 mols, based on 100 mols of said combination of barium titanate with strontium titanate.

6. A ceramic composition according to claim 4, wherein the content of at least one oxide selected from the group consisting of said oxides severally of Cu, Zn, Mg, and Mo is in the range of 0.005 to 0.8% by weight, based on the total amount of said compounds.

* * * * *